(12) United States Patent
Dybro

(10) Patent No.: US 6,237,436 B1
(45) Date of Patent: May 29, 2001

(54) SHIFT LEVER INTERLOCK

(75) Inventor: Niels Dybro, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/360,916

(22) Filed: Jul. 26, 1999

(51) Int. Cl.[7] ............................. G05G 5/08; B60K 20/00; F16H 59/02
(52) U.S. Cl. .................................. 74/473.25; 74/473.24; 74/471 XY; 74/473.33
(58) Field of Search ........................... 74/473.24, 473.25, 74/473.26, 473.28, 471 XY

(56) References Cited

U.S. PATENT DOCUMENTS

| | | | |
|---|---|---|---|
| 826,851 | * 7/1906 | Hendrickson | 74/473.25 |
| 854,480 | * 5/1907 | Frayer et al. | 74/473.24 |
| 2,772,652 | * 12/1956 | Shane et al. | 74/473.33 |
| 2,775,134 | * 12/1956 | Swenson | 74/473.33 |
| 3,774,474 | * 11/1973 | Recker et al. | 74/473.1 |
| 3,939,733 | * 2/1976 | Wetrich | 74/473.24 |
| 3,987,878 | 10/1976 | Hansen . | |
| 4,018,424 | 4/1977 | Latimer . | |
| 4,371,063 | 2/1983 | Troemner et al. . | |
| 4,438,657 | * 3/1984 | Nobis | 74/473.21 |
| 4,478,109 | 10/1984 | Kobelt . | |
| 4,513,847 | 4/1985 | Hansen . | |
| 4,526,055 | 7/1985 | Batchelor et al. . | |
| 5,373,924 | 12/1994 | McKee et al. . | |
| 5,499,553 | 3/1996 | Schott et al. . | |
| 5,537,892 | 7/1996 | Wiechman . | |
| 5,551,265 | 9/1996 | Garman et al. . | |

FOREIGN PATENT DOCUMENTS 55-102735  8/1980 (JP) .

OTHER PUBLICATIONS

John Deere 7000 Series, 3 pp.

* cited by examiner

Primary Examiner—David A. Bucci
Assistant Examiner—William C Joyce

(57) ABSTRACT

A shift lever assembly includes a housing, a first shift member pivotally supported by the housing and for linking to a first transmission actuator, a second shift member pivotally supported by the housing for linking to a second transmission actuator, and a lever movable to selectively engage and operate the first and second shift members. An elongated interlock member is coupled to the lever and slidably received by the first and second shift members. The member has ends which remain slidably received by housing sleeves so that the member cannot move transversely to its sliding axis. Part of the member engages the second shift member to prevent pivoting of the second shift member when the lever moves into engagement with the first shift member.

18 Claims, 5 Drawing Sheets

SHIFT LEVER INTERLOCK

BACKGROUND OF THE INVENTION

The invention relates to an interlock for a vehicle shift lever assembly.

A known shift lever assembly for a production vehicle, such as an agricultural tractor, includes a park shift member which is linked to a park actuator on the transmission via a Bowden cable and a forward-neutral-reverse (F-N-R) shift member which is linked to forward, neutral and reverse transmission actuators via Bowden cable and rod linkage. A forward, neutral, reverse, park (F-N-R-P) lever is movable within a guide slot and to selectively engage and operate the park shift member and the F-N-R shift member. It would be desirable to provide an interlock mechanism which, when the lever is out of engagement with the F-N-R shift member, prevents inadvertent actuation of the F-N-R shift member, such as by movement of the linkages or cables between the shift member and the actuator on the transmission.

SUMMARY OF THE INVENTION

Accordingly, an object of this invention is to provide an interlock mechanism for a transmission shift lever assembly which, when the lever is in the park position, prevents the transmission from being inadvertently placed in a forward or reverse operative condition.

This and other objects are achieved by the present invention, wherein a shift lever assembly includes a housing having side walls with apertures formed therein, a first shift member pivotally supported by the housing and for linking to a first transmission actuator, a second pivotally supported by the housing for linking to a second transmission actuator, and a lever movable to selectively engage and operate the first and second shift members. An elongated interlock member is coupled to the lever and slidably received by the first and second shift members. The member has ends which are received by the apertures, and having a part which engages the second shift member to prevent pivoting of the second shift member when the leer moves into engagement with the first shift member.

DESCRIPTION OF THE PREFERRED EMBODIMENT

Figure 1:
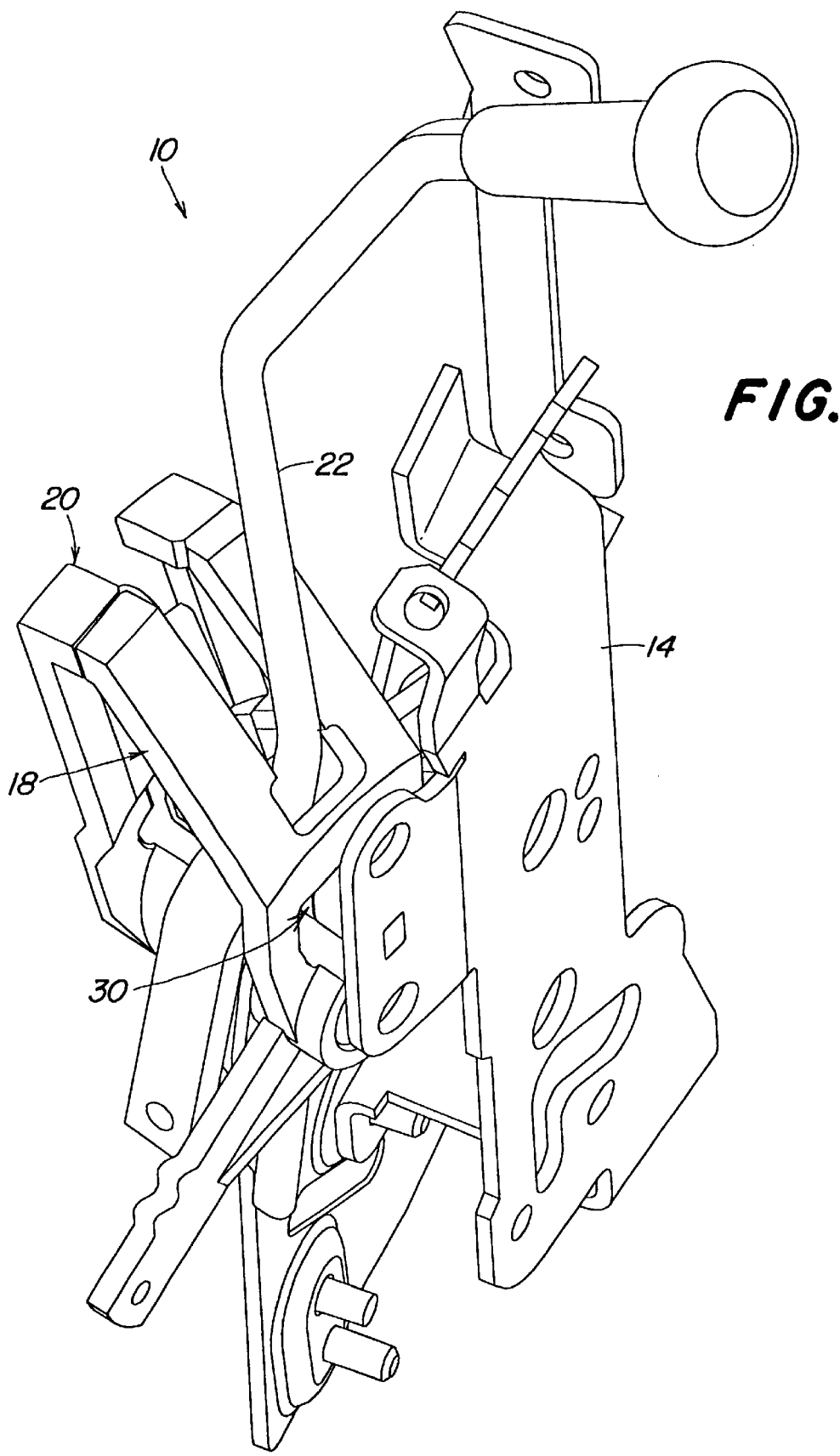
FIG. 1 is a perspective view of a transmission shift lever assembly for which includes the present invention.
Figure 2:
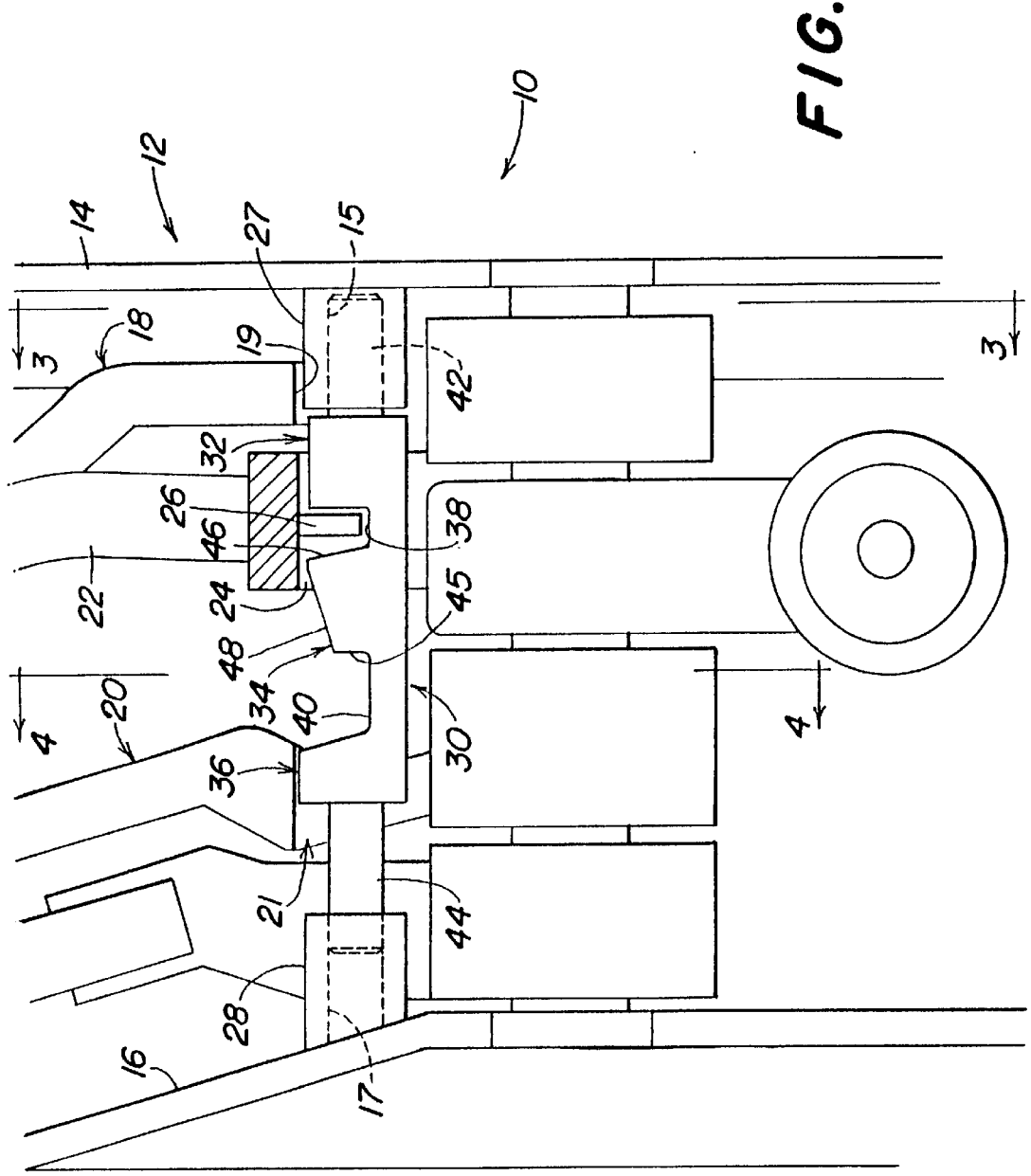
FIG. 2 is a sectional view of the assembly of FIG. 1 illustrating more clearly the interlock member of the present invention.
Figure 3:
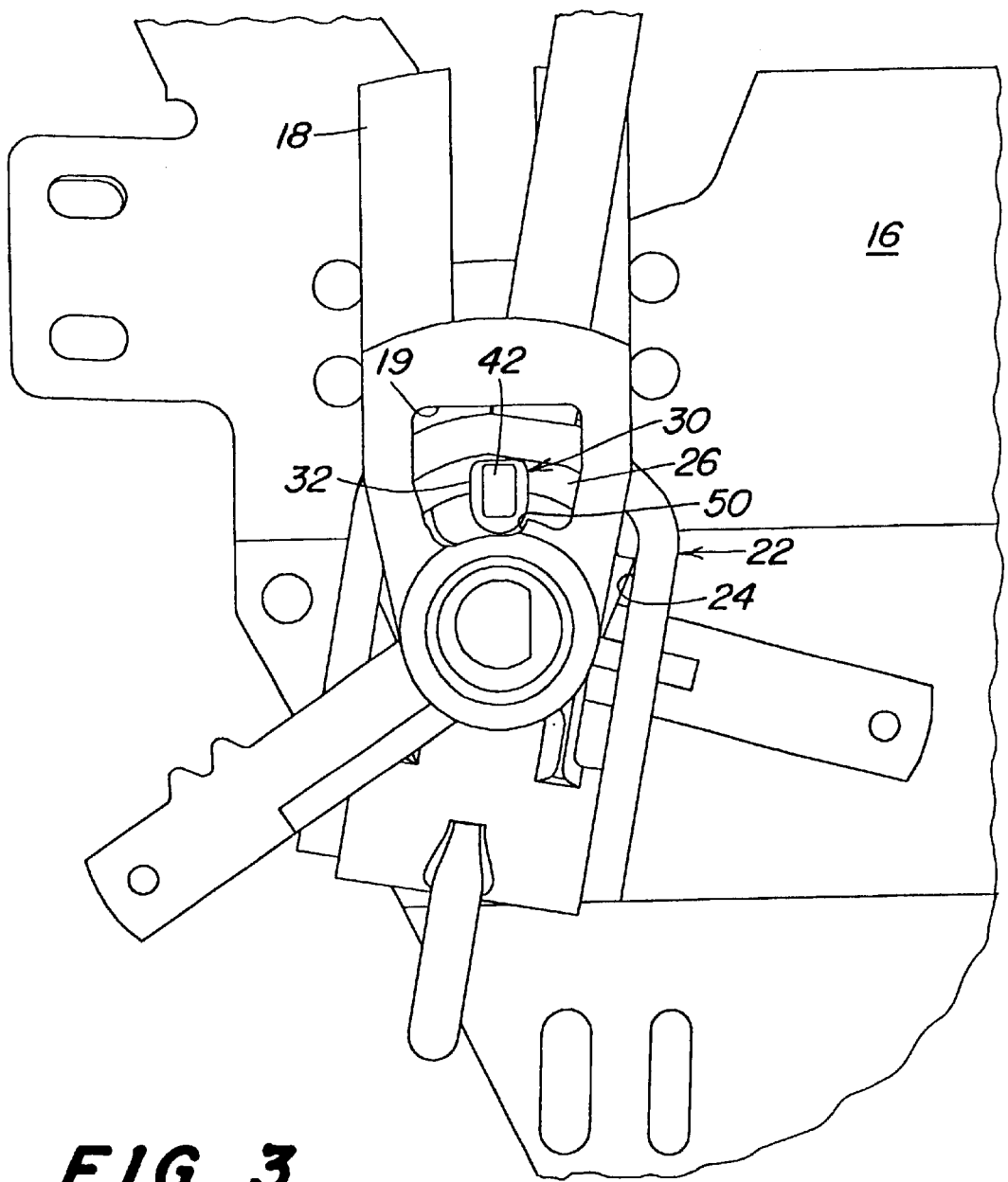
FIG. 3 is a view along lines 3—3 of FIG. 2 with parts removed for clarity.

Referring to FIGS. 1, 2 and 3, a shift lever assembly 10 includes a housing 12 with a pair of side walls 14 and 16. Rectangular apertures 15 and 17 are formed in sleeves 27 and 28 which are fixed to and which project inwardly from walls 14 and 16, respectively. Pivotally supported in a conventional manner between walls 14 and 16 is a park shift member 18 which is linked via a conventional Bowden cable (not shown) to a conventional transmission park actuator (not shown), and a forward-neutral-reverse F-N-R shift member 20 which is linked via a conventional Bowden cable and rod linkage (not shown) to conventional transmission forward, neutral and reverse transmission actuator (not shown). A forward-neutral-reverse-park (F-N-R-P) lever 22 is movable to selectively engage and operate the F-N-R shift member 20 and park shift member 18. Shift member 18 and shift member 20 have openings 19 and 21, respectively. An opening 24 extends through lever 22. A tab 26 on lever 22 projects downwardly into the opening 24.

Referring now to FIGS. 2 and 3, an interlock member 30 is coupled to the lever 22 and slidably received by opening 19 of the park shift member 18 and by opening 21 of the F-N-R shift member 20. The interlock member 30 includes a first land 32, a second land 34 and a third land 36. Lands 32 and 34 are separated by a first slot 38 which extends transverse to a sliding axis of interlock member 30. Lands 34 and 36 are separated by a second slot 40 which also extends transverse to the sliding axis of interlock member 30. Stems 42 and 44 project from opposite ends of the member 30 and are received by apertures 15, 17 in sleeves 27 and 28, respectively. The length of the stems 42, 44 is such that they are at all times at least partially received by the respective apertures 15, 17. This prevents the member 30 from being moved transversely with respect to its longitudinal sliding axis.

Slot 38 receives tab 26 of the lever 22, so that the lever 22 can pivot transversely with respect to a longitudinal or sliding axis of the member 30, and so that member 30 will slide along with the lever 22 as the lever 22 is pivoted towards and away from shift member 20 and in a plane which is parallel to the sliding axis of member 30.

Land 34 has a first end 45 adjacent the second slot 40 and a second end 46 adjacent the first slot 38. The first end 45 has a smaller height than that of the second end 46 so that land 34 has a sloping outer surface 48 therebetween. This sloping outer surface 48 provides a clearance which permits pivoting of the lever 22 towards the F-N-R shift member 20.

Figure 4:
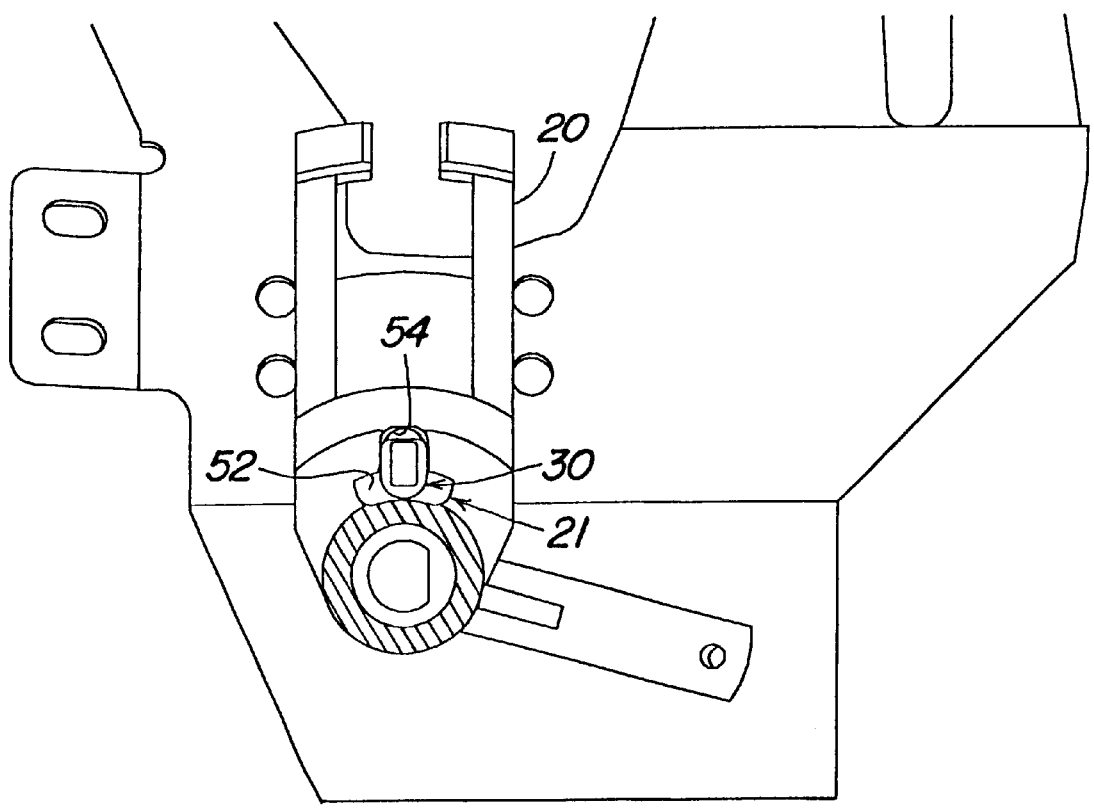
FIG. 4 is a view along lines 4—4 of FIG. 2.
Figure 5:
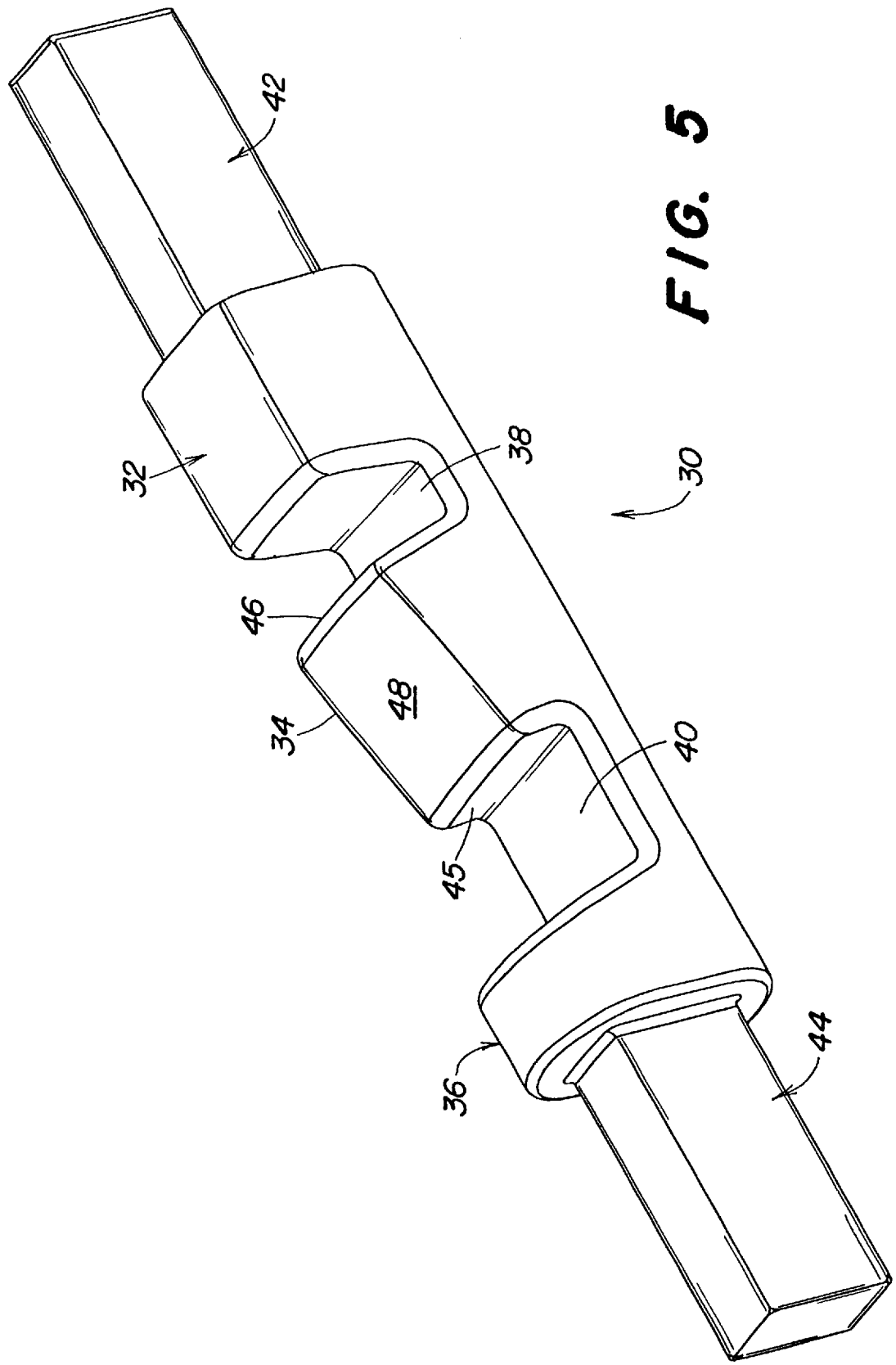
FIG. 5 is an enlarged perspective view of the interlock member of FIG. 2.

As best seen in FIGS. 2 and 3, the opening 24 in lever 22 is significantly larger than the outer dimensions of member 30 so that the lever 22 can be pivoted from the position shown. Similarly, the opening 19 in shift member 18 is significantly larger than the outer dimensions of member 30 and/or sleeve 27 so that the shift member 18 can be pivoted clockwise into its park position before the wall of opening 19 engages the outer surface of member 30 and/or sleeve 27. The wall of opening 19 forms a shoulder 50 which engages the member 30 and/or sleeve 27 to prevent the shift member 18 from being pivoted counter-clockwise from the position shown in FIG. 3. As best seen in FIG. 4, opening 21 in shift member 20 has an inverted "T" shape, with a larger lower portion 52 and a smaller upper portion 54. The lower portion 52 of opening 21 is significantly larger than the outer dimensions of member 30 so that the shift member 20 can be pivoted when shift member 20 is in registry with slot 40.

Mode of Operation

With lever 22 in engagement with the shift member 18 as shown in FIG. 2, the engagement between tab 26 and the walls of slot 38 maintains the member 30 in the position shown wherein the land 36 of member 30 will engage the F-N-R quadrant 20. At the same time, the ends 42 and 44 of member 30 are received by the housing sleeves 27 and 28. This prevents inadvertent pivoting of the shift member 20, thus preventing inadvertent placement of the shift member 20 in a forward or reverse operating position.

If the lever 22 is moved to the left (viewing FIGS. 1 and 2) and into engagement with the shift member 20, the engagement between tab 26 and the walls of slot 38 moves the member 30 into a position wherein the ends 42 and 44 of member 30 remain received by the housing sleeves 27 and 28, but wherein the slot 40 of member 30 will be in registry with the F-N-R shift member 20. This permits the lever 22 to pivot shift member 20 transversely with respect to the sliding axis of member 30.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

What is claimed is:

1. A shift lever assembly comprising:

a housing having an aperture formed therein;

a first shift member pivotally supported by the housing and for linking to a first transmission actuator;

a second shift member pivotally supported by the housing for linking to a second transmission actuator;

a lever movable to selectively engage and operate the first and second shift members, the lever has a tab projecting therefrom; and an elongated interlock member coupled to the lever and slidably received by the first and second shift member, the interlock member having an end which is received by the aperture, and having a part which engages the second shift member to prevent pivoting of the second shift member when the lever moves into engagement with the first shift member, the interlock member being slidable along an axis, the interlock member having first, second and third lands, the first and second lands being separated by a first slot which extends transverse to said axis and which receives the tab, the interlock member having a second slot between the second and third lands, the tab engaging the first and second lands so that the interlock member slides along said axis as the lever is pivoted in a plane parallel to said axis, the third land being engagable with the second shift member to prevent pivoting of the second shift member when the lever is not in a position to actuate the second shift member, and the second slot being in registry with the second shift member to permit pivoting of the second shift member when the lever is in a position to actuate the second shift member.

2. The shift lever assembly of claim 1, wherein:

the end of the interlock member remains received by the aperture during all positions of the lever.

3. The shift lever assembly of claim 1, wherein:

the tab is movable through the first slot to permit pivoting of the lever in directions transverse to said axis.

4. The shift lever assembly of claim 1, wherein:

the second land has a first end adjacent the second slot and a second end adjacent the first slot, the first end having a smaller height with respect to the height of the second end and the second land having a sloping outer surface which extends from first end to the second end, the sloping outer surface providing a clearance which permits pivoting of the lever towards the second shift member.

5. The shift lever assembly of claim 1, wherein:

the first shift member is located between the aperture and the second shift member.

6. A shift lever assembly comprising:

a housing;

a first shift member pivotally supported by the housing and for linking to a first transmission actuator;

a second shift member pivotally supported by the housing for linking to a second transmission actuator;

a lever movable to selectively engage and operate the first and second shift members, the lever having a tab projecting therefrom; and an elongated interlock member slidable along an axis, the interlock member having first, second and third lands, the first and second lands being separated by a first slot which extends transverse to said axis and which receives the tab, the interlock member having a second slot between the second and third lands, the tab engaging the first and second lands so that the interlock member slides along said axis as the lever is pivoted in a plane parallel to said axis, the third land being engagable with the second shift member to prevent pivoting of the second shift member when the lever is not in a position to actuate the second shift member, and the second slot being in registry with the second shift member to permit pivoting of the second shift member when the lever is in a position to actuate the second shift member.

7. The shift lever assembly of claim 6, wherein:

an aperture is formed by the housing; and an end of the interlock member is received by the aperture.

8. The shift lever assembly of claim 6, wherein:

the interlock member is received by the first and second shift members.

9. The shift lever assembly of claim 6, wherein:

the tab is movable through the first slot to permit pivoting of the lever in directions transverse to said axis.

10. The shift lever assembly of claim 6, wherein:

the second land has a first end adjacent the second slot and a second end adjacent the first slot, the first end having a smaller height with respect to the height of the second end and the second land having a sloping outer surface which extends from first end to the second end, the sloping outer surface providing a clearance which permits pivoting of the lever towards the second shift member.

11. The shift lever assembly of claim 7, wherein:

the first shift member is located between the aperture and the second shift member.

12. An interlock mechanism for a shift lever assembly having a housing, a first shift member pivotally supported by the housing and for linking to a first transmission actuator, a second shift member pivotally supported by the housing for linking to a second transmission actuator; a lever movable to selectively engage and operate the first and second shift members, the interlock mechanism comprising:

a tab projecting from the lever; and an interlock member slidable along an axis, the interlock member having first, second and third lands, the first and second lands being separated by a first slot which extends transverse to said axis and which receives the tab, the interlock member having a second slot between the second and third lands, the tab engaging the first and second lands so that the interlock member slides along said axis as the lever is pivoted in a plane parallel to said axis, the third land being engagable with the second shift member to prevent pivoting of the second shift member when the lever is not in a position to actuate the second shift member, and the second slot being in registry with the second shift member to permit pivoting of the second shift member when the lever is in position to operate the second shift member.

13. The shift lever assembly of claim 12, wherein:

an aperture formed in the housing adjacent the first shift member; and an end of the interlock member is received by the aperture.

14. The shift lever assembly of claim 12, wherein:

the interlock member is received by the first and second shift members.

15. The shift lever assembly of claim 12, wherein:

the tab is movable through the first slot to permit pivoting of the lever in directions transverse to said axis.

16. The shift lever assembly of claim 12, wherein:

the second land has a first end adjacant the second slot and a second end adjacent the first slot, the first end having a smaller height with respect to the height of the second end and the second land having a sloping outer surface which extends from first end to the second end, the sloping outer surface providing a clearance which permits pivoting of the lever towards the second shift member.

17. The shift lever assembly of claim 13, wherein:

the first shift member is located between the aperture and the second shift member.

18. In a shift lever assembly having a housing, a park shift member pivotally supported by the housing for linking to a transmission park actuator, a forward-neutral-reverse F-N-R shift member pivotally supported by the housing for linking to transmission forward, neutral and reverse transmission actuators, a lever movable to selectively engage and operate the park shift member and F-N-R shift member, an interlock mechanism comprising:

the lever has a tab projecting therefrom: and an interlock member coupled to the lever and slidably received by the park shift member and the F-N-R shift member, the interlock member being movable by the lever to an interlock position wherein the interlock member engages the F-N-R shift member and prevents actuation of the F-N-R shift member when the lever is not in a position to actuate the F-N-R shift member, the interlock member is slidable along an axis, the interlock member having first, second and third lands, the first and second lands being separated by a first slot which extends transverse to said axis and which receives the tab, the interlock member having a second slot between the second and third lands, the tab engaging the first and second lands so that the interlock member slides along said axis as the lever is pivoted in a plane parallel to said axis, the third land being engagable with the F-N-R shift member to prevent pivoting of the F-N-R shift member when the lever is not in position to operate the F-N-R shift member, and the second slot being in registry with the F-N-R shift member to permit pivoting of the F-N-R shift member when the lever is in position to operate the F-N-R shift member.

* * * * *